United States Patent
Maruyama et al.

(10) Patent No.: US 9,061,679 B2
(45) Date of Patent: Jun. 23, 2015

(54) CONTROL APPARATUS FOR HYBRID VEHICLE

(75) Inventors: Tomoyuki Maruyama, Tajimi (JP); Norihiro Yamamura, Miyoshi (JP); Akiko Nishimine, Toyota (JP); Ryoki Il, Toyota (JP); Tomoaki Furukawa, Toyota (JP); Takeshi Kanayama, Toyota (JP); Tetsuo Hori, Toyota (JP); Koji Hayashi, Aichi-gun (JP); Takeshi Miyagawa, Toyokawa (JP); Akihiro Sato, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/006,470

(22) PCT Filed: Mar. 24, 2011

(86) PCT No.: PCT/JP2011/057113
§ 371 (c)(1),
(2), (4) Date: Oct. 8, 2013

(87) PCT Pub. No.: WO2012/127674
PCT Pub. Date: Sep. 27, 2012

(65) Prior Publication Data
US 2014/0051546 A1 Feb. 20, 2014

(51) Int. Cl.
*B60W 10/02* (2006.01)
*B60W 10/08* (2006.01)
(Continued)

(52) U.S. Cl.
CPC .............. *B60W 20/10* (2013.01); *Y10T 477/26* (2015.01); *B60K 6/442* (2013.01); *B60K 6/52* (2013.01); *B60K 6/543* (2013.01); *B60W 10/06* (2013.01);
(Continued)

(58) Field of Classification Search
CPC .......... B60K 6/52; B60K 6/442; B60K 6/543; B60W 20/00; B60W 20/10; B60W 20/40
USPC ................. 477/5; 180/65.265, 65.21, 65.275, 180/65.285
See application file for complete search history.

(56) References Cited

U.S. PATENT DOCUMENTS 5,927,415 A 7/1999 Ibaraki et al.
6,549,840 B1 * 4/2003 Mikami et al. ............... 701/69
(Continued)

FOREIGN PATENT DOCUMENTS

DE 60303731 T2 8/2006
DE 102007000331 A1 2/2008
(Continued)

*Primary Examiner* — Justin Holmes
*Assistant Examiner* — Tinh Dang
(74) *Attorney, Agent, or Firm* — Oliff PLC

(57) ABSTRACT

A control apparatus for a hybrid vehicle includes: engine starting means for starting an engine when a need for switching to a 4-wheel drive mode has been forecasted, the hybrid vehicle having a series HV drive mode in which the hybrid vehicle is run with a second electric motor, in the released state of a connecting/disconnecting device, while a first electric motor is operated with a drive force of said engine to generate an electric energy, the control apparatus further including, as said engine starting means, series HV drive controlling means for starting said engine and enlarging a series HV drive mode region for running the hybrid vehicle in said series HV drive mode, so as to cover a portion or an entirety of an original EV drive mode region for running the hybrid vehicle in said EV drive mode, when the need for switching to said 4-wheel drive mode has been forecasted.

5 Claims, 6 Drawing Sheets

(51) Int. Cl.
*B60W 20/00* (2006.01)
*B60K 6/442* (2007.10)
*B60K 6/52* (2007.10)
*B60K 6/543* (2007.10)
*B60W 10/06* (2006.01)

(52) U.S. Cl.
CPC .............. *B60W 20/00* (2013.01); *B60W 20/40* (2013.01); *Y02T 10/84* (2013.01); *Y02T 10/6234* (2013.01); *Y02T 10/6265* (2013.01); *Y10S 903/93* (2013.01)

(56) References Cited

U.S. PATENT DOCUMENTS

| | | | |
|---|---|---|---|
| 7,617,025 B2 * | 11/2009 | Yamamoto et al. | 701/14 |
| 2002/0094908 A1 | 7/2002 | Urasawa et al. | |
| 2004/0134698 A1 | 7/2004 | Yamamoto et al. | |
| 2004/0135527 A1 * | 7/2004 | Tatara et al. | 318/139 |
| 2005/0173179 A1 | 8/2005 | Amanuma et al. | |
| 2008/0004780 A1 | 1/2008 | Watanabe et al. | |
| 2008/0190675 A1 * | 8/2008 | Itoh et al. | 180/65.2 |
| 2008/0305924 A1 | 12/2008 | Soliman et al. | |

FOREIGN PATENT DOCUMENTS

| | | |
|---|---|---|
| DE | 102008020373 A1 | 12/2008 |
| JP | A-09-117009 | 5/1997 |
| JP | A-2004-208477 | 7/2004 |
| JP | A-2004-222413 | 8/2004 |
| JP | A-2005-186736 | 7/2005 |
| JP | A-2005-225282 | 8/2005 |
| JP | A-2009-274566 | 11/2009 |

* cited by examiner

FIG.1

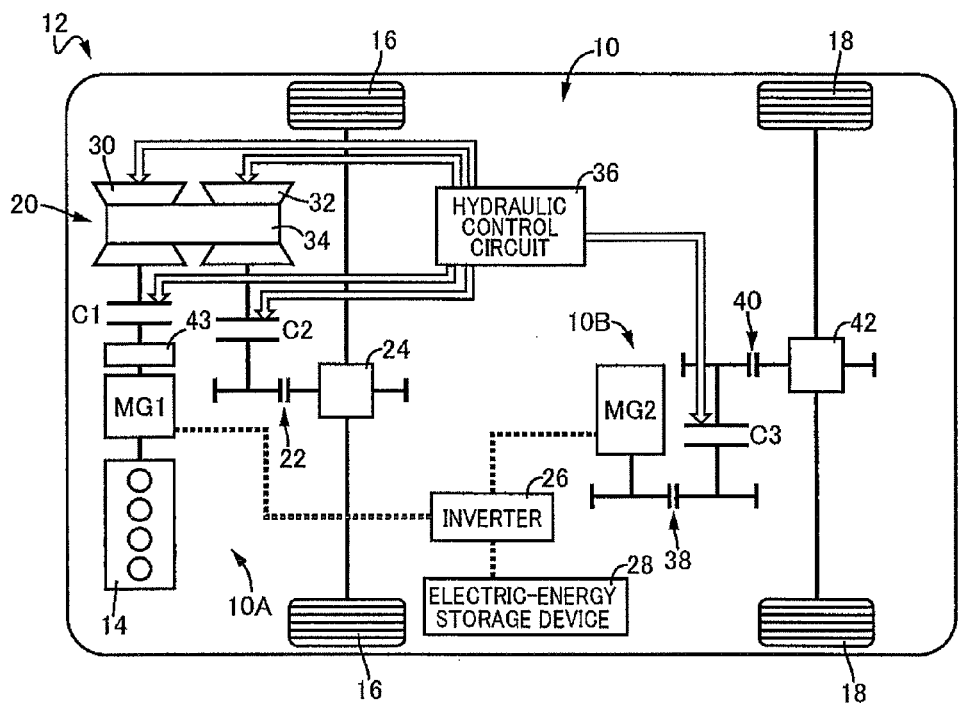

FIG.2

|  | ENGINE | MG1 | C1 | C2 | MG2 | C3 |
|---|---|---|---|---|---|---|
| EV DRIVE MODE | OFF | OFF | OFF | OFF | VEHICLE DRIVING | ON |
| SERIES HV DRIVE MODE 1 | ON | ELECTRICITY GENERATION | OFF | OFF | VEHICLE DRIVING | ON |
| SERIES HV DRIVE MODE 2 | ON | ELECTRICITY GENERATION | ON | OFF | VEHICLE DRIVING | ON |
| SERIES HV DRIVE MODE 3 | ON | ELECTRICITY GENERATION | OFF | ON | VEHICLE DRIVING | ON |
| 4-WHEEL DRIVE MODE (PARALLEL) | ON | OFF / VEHICLE DRIVING | ON | ON | VEHICLE DRIVING | ON |
| 4-WHEEL DRIVE MODE (SERIES × PARALLEL) | ON | ELECTRICITY GENERATION | ON | ON | VEHICLE DRIVING | ON |
| 4-WHEEL DRIVE MODE (e-4WD) | OFF | VEHICLE DRIVING | ON | ON | VEHICLE DRIVING | ON |

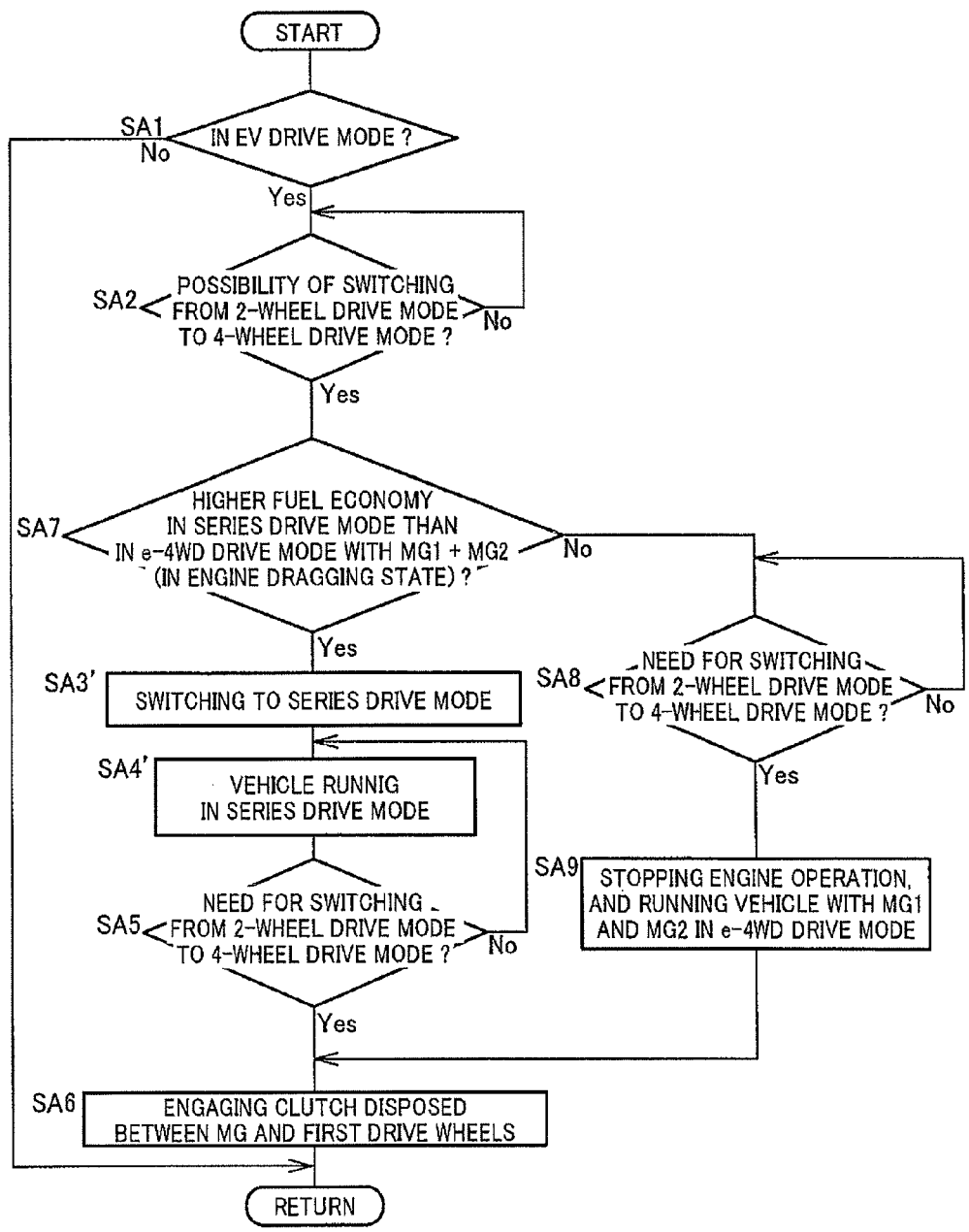

CONTROL APPARATUS FOR HYBRID VEHICLE

TECHNICAL FIELD

The present invention relates to a control apparatus for a hybrid vehicle, and more particularly to a control of a hybrid vehicle which is switchable to a 4-wheel drive mode.

BACKGROUND ART

There is known a control apparatus for a hybrid vehicle which is provided with an engine, a first electric motor connected in series to the engine, a connecting/disconnecting device disposed between those engine and first electric motor and first drive wheels, and a second electric motor connected to second drive wheels, and which is switchable to a selected one of: an EV drive mode in which the hybrid vehicle is run with only the above-described second electric motor; a series HV drive mode in which the hybrid vehicle is run with the second electric motor while the above-described first electric motor is operated with a drive force of the above-described engine, to perform a regenerative operation, in a released state of the above-described connecting/disconnecting device; and a 4-wheel drive mode in which the above-described first drive wheels are driven with at least one of the above-described engine and the above-described first electric motor, in an engaged state of the above-described connecting/disconnecting device, while the above-described second drive wheels are driven with the above-described second electric motor. Patent Document 1 discloses an example of a control apparatus for a drive system of such a hybrid vehicle. The drive system disclosed in this Patent Document 1 has an electric motor drive mode (EV drive mode) consisting of two sub-modes, that is, a first sub-mode in which a first motor (first electric motor) is held at rest, and a second sub-mode which is selected when a load acting on a second motor (second electric motor) is larger than in the first sub-mode, and in which the first motor is supplied with an electric energy for rotating a drive shaft connected to the engine, at a predetermined speed.

PRIOR ART DOCUMENT

Patent Document

Patent Document 1: JP-2004-208477A

SUMMARY OF THE INVENTION

Object Achieved by the Invention

By the way, the hybrid vehicle disclosed in the Patent Document 1 is configured such that switching to the 4-wheel drive mode during running of the hybrid vehicle in the EV drive mode usually requires stopping of the running in the EV drive mode, and starting of the engine to drive the first drive wheels, or driving of the first drive wheels with the first electric motor in a dragging state of a crankshaft, etc. of the engine. Where the first drive wheels are driven with the started engine, it is necessary to place the above-described connecting/disconnecting device in the engaged state to connect the engine to the first drive wheels, after the engine has been started, so that the switching to the 4-wheel drive mode requires a longer time, giving rise to a possibility of a failure to obtain a desired vehicle drive force in a short time.

The present invention was made in view of the background art described above. It is therefore an object of the present invention to provide a control apparatus for a hybrid vehicle, which permits a desired vehicle drive force to be obtained in a short time upon switching to the 4-wheel drive mode during running of the hybrid vehicle in the EV drive mode.

Means for Achieving the Object

The object indicated above is achieved according to the first aspect of the invention, which provides (a) a control apparatus for a hybrid vehicle provided with an engine, a first electric motor connected to the above-described engine, a connecting/disconnecting device disposed between the engine and the first electric motor and first drive wheels, and a second electric motor connected to second drive wheels, the hybrid vehicle being configured to switch to a selected one of an EV drive mode in which the hybrid vehicle is run with only the above-described second electric motor, and a 4-wheel drive mode in which the above-described first drive wheels are driven with at least one of the above-described engine and the above-described first electric motor, in an engaged state of the above-described connecting/disconnecting device in accordance with a vehicle running condition, while the above-described second drive wheels are driven with the above-described second electric motor, (b) the above-described control apparatus being characterized by starting the above-described engine when a need for switching to the 4-wheel drive mode has been forecasted, (c) the hybrid vehicle further having a series HV drive mode in which the hybrid vehicle is run with the second electric motor, in the released state of said connecting/disconnecting device, while said first electric motor is operated with a drive force of said engine to generate an electric energy, and (d) the control apparatus starting said engine and enlarging a series HV drive mode region for running the hybrid vehicle in said series HV drive mode, so as to cover a portion or an entirety of an original EV drive mode region for running the hybrid vehicle in said EV drive mode, when the need for switching to said 4-wheel drive mode has been forecasted.

Advantages of the Invention

The control apparatus described above is configured to permit the vehicle drive mode to be rapidly switched to the 4-wheel drive mode, by placing the connecting/disconnecting device in the engaged state when the need for actual switching to the 4-wheel drive mode is determined. Namely, since the engine has already been started, the time required for switching the vehicle drive mode to the 4-wheel drive mode can be shortened by a length of time required for starting the engine, so that the desired vehicle drive force can be obtained in a short time.

In a preferred form of this invention, the hybrid vehicle further has a series HV drive mode in which the hybrid vehicle is run with the second electric motor, in the released state of the above-described connecting/disconnecting device, while the above-described first electric motor is operated with a drive force of the above-described engine to generate an electric energy, and the control apparatus is configured to start the above-described engine and enlarge a series HV drive mode region for running the hybrid vehicle in the above-described series HV drive mode, so as to cover a portion or an entirety of an original EV drive mode region for running the hybrid vehicle in the above-described EV drive mode, when the need for switching to the 4-wheel drive mode has been forecasted. In this form of the invention, in the above-described EV drive mode, the series HV drive mode is selected when the need for switching to the 4-wheel drive mode has been forecasted, so that upon determination that it is actually necessary to switch the vehicle drive mode to the 4-wheel drive mode, the above-described connecting/disconnecting device is engaged to rapidly switch the vehicle drive mode to the 4-wheel drive mode. In addition, the series HV drive mode is maintained until the moment of the determination of the need for switching to the 4-wheel drive mode, so that reducing the deterioration of the fuel economy is reduced due to a higher degree of freedom in operating point of the engine relative to the 4-wheel drive mode for running the vehicle with the engine connected to the drive wheels, whereby it is possible to rapidly switch the vehicle drive mode from the series HV drive mode to the desired 4-wheel drive mode, when the 4-wheel drive mode is needed.

In another preferred form of the invention, an output of the above-described engine in the series HV drive mode selected after the need for switching to the above-described 4-wheel drive mode has been forecasted is set to be lower than that in said series HV drive mode before the above-described series HV drive mode region is enlarged. In this preferred form of the invention, the vehicle operator is less likely to feel uneasy about vibrations of the engine even if the vehicle drive mode is switched to the series HV drive mode in which the engine is placed in the operated state when the EV drive mode can be selected in which the engine is not operated. Since the point of the vehicle running condition presently lies in the original EV drive mode region, the vehicle can be run with a sufficient amount of electric energy supplied from a battery after switching of the vehicle drive mode to the series HV drive mode, even if the output of the engine is set to be lower than that before the series HV drive mode region is enlarged. By thus setting the output of the engine to be lower than that before the series HV drive mode region is enlarged, deterioration of the fuel economy of the vehicle can be reduced, while at the same time the drivability of the vehicle can be kept as usual.

In a farther preferred form of the invention, the control apparatus is configured to inhibit the switching to the above-described series HV drive mode, and to place the hybrid vehicle in a 4-wheel drive run in which the hybrid vehicle is run with the above-described first electric motor and the above-described second electric motor, upon determination of switching to the 4-wheel drive mode, if it has been determined that the 4-wheel chive run in which the hybrid vehicle is run with the above-described first electric motor and the above-described second electric motor while the above-described engine is placed in a rest state has a higher degree of fuel economy than the above-described series HV drive mode, after the need for switching to the above-described 4-wheel drive mode has been forecasted. In this form of the invention wherein the hybrid vehicle is run with the four drive wheels in one of the 4-wheel drive mode and the series HV drive mode which is determined to have the higher degree of fuel economy, so that the fuel economy is improved.

In a still further preferred form of the invention, the hybrid vehicle is provided with an oil pump which is operated by the above-described engine to apply a hydraulic pressure to the above-described connecting/disconnecting device, for placing the connecting/disconnecting device selectively in a power transmitting state or a power cut-off state, and the control apparatus is configured to apply the hydraulic pressure to the connecting/disconnecting device, for keeping the connecting/disconnecting device ready to be placed in the power transmitting state with a predetermined hydraulic pressure, when the need for switching to the 4-wheel drive mode has been forecasted. In this form of the invention, the vehicle drive mode can be rapidly switched to the 4-wheel drive mode when the need for actual switching to the 4-wheel drive mode is determined.

BRIEF DESCRIPTION OF THE DRAWINGS

FIG. 1 is a schematic view showing an arrangement of a vehicle provided with a drive system for a hybrid vehicle constructed according to one embodiment of the present invention;

FIG. 2 is a table indicating operating states of various devices in different drive mode of the vehicle of FIG. 1;

FIG. 10 is a flow chart for explaining major portions of a control operation of the electronic control device of FIG. 8.

MODE FOR CARRYING OUT THE INVENTION

Figure 3:
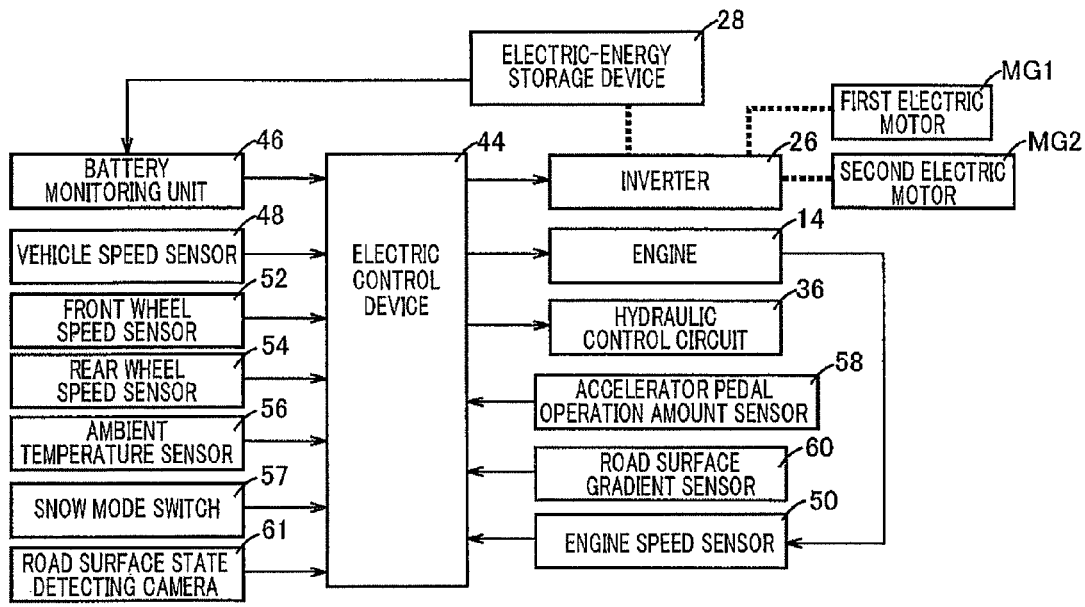
FIG. 3 is a functional block diagram showing major functions of a control system provided for the vehicle of FIG. 1.

Embodiments of the present invention will be described in detail by reference to the drawings. It is to be understood that the drawings showing the embodiments are simplified or transformed as needed, and do not necessarily accurately show dimensions and shapes of various portions shown therein.

First Embodiment

FIG. 1 is the schematic view showing an arrangement of a vehicle 12 provided with a drive system for a hybrid vehicle 10 constructed according to one embodiment of this invention (hereinafter referred to as "drive system 10"). As shown in FIG. 1, the vehicle 12 is a hybrid vehicle provided with a plurality of drive power sources, that is, an engine 14, a first electric motor MG1 and a second electric motor MG2.

The drive system 10 includes a front drive portion 10A provided with the drive power sources in the form of the engine 14 and the first electric motor MG1 to drive a pair of right and left front wheels (first drive wheels) 16, and a rear drive portion 10B provided with the drive power source in the form of the second electric motor MG2 to drive a pair of right and left rear wheels (second drive wheels) 18.

The above-described front drive portion 10A is provided with the engine 14, and the following devices disposed in a power transmitting path between the engine 14 and the front wheels 16, in the order of description in the direction from the engine 14, and connected in series to each other: the first electric motor MG1; a first clutch C1; a transmission 20; a second clutch C2; a first gear pair 22; and a front wheel differential gear device 24. The engine 14 is connected to the front wheels 16 through the first electric motor MG1, first clutch C1, transmission 20, second clutch C2, first gear pair 22 and front wheel differential gear device 24 in sequence.

The engine 14 is an internal combustion engine well known in the art, an output of which is adjusted by controlling an intake air quantity, an amount of injection of a fuel, an ignition timing, etc., for example. The first electric motor MG1 functions as an engine starting device (engine starter) for starting the engine.

The first electric motor MG1 is an AC electric motor of a synchronous type which functions as an electric motor and an electric generator, and which is electrically connected to an electric-energy storage device 28 through an inverter 26. An operating speed. Nmg1 of the first electric motor MG1 is controlled by the inverter 26.

The transmission 20 is a belt-type continuously-variable transmission well known in the art, which is provided with an input variable-diameter pulley 30 connected to the first electric motor MG1 through the first clutch C1, an output variable-diameter pulley 32 disposed in parallel with the input variable-diameter pulley 30 and connected to the first gear pair 22 through the second clutch C2, and a power transmitting belt 34 connecting those pulleys 30 and 32. This transmission 20 is configured such that an effective width of a groove of the variable-diameter pulley 32 and a squeezing pressure of the power transmitting belt are controlled by a hydraulic control circuit 36, to change a speed ratio γ which is an input/output speed ratio of the transmission 20. The above-indicated speed ratio γ is a ratio (Nin/Nout) of an input-side pulley speed, namely, a rotating speed Nin of the input variable-diameter pulley 30, with respect to an output-side pulley speed, namely, a rotating speed Nout of the output variable-diameter pulley 32.

Each of the first clutch C1 and the second clutch C2 is a wet-type multiple-disk clutch well known in the art, an operating state of which is controlled by the hydraulic control circuit 36. It is noted that the first and second clutches C1 and C2 correspond to a connecting/disconnecting device used according to the present invention.

The above-described rear drive portion 10B is provided with the second electric motor MG2, and the following devices disposed in a power transmitting path between the second electric motor MG2 and the rear wheels 18, in the order of description in the direction from the second electric motor MG2, and connected in series to each other: a second gear pair 38; a third clutch C3; a third gear pair 40; and a rear wheel differential gear device 42. The second electric motor MG2 is connected to the rear wheels 18 through the second gear pair 38, third clutch C3, third gear pair 40 and rear wheel differential gear device 42 in sequence.

Like the first electric motor MG1, the second electric motor MG2 is an AC electric motor of a synchronous type which functions as an electric motor and an electric generator, and which is electrically connected to the electric-energy storage device 28 through the inverter 26. An operating speed Nmg2 of the second electric motor MG2 is controlled by the inverter 26.

Like the second clutch C2, the third clutch C3 is a wet-type multiple-disk clutch well known in the art, an operating state of which is controlled by the hydraulic control circuit 36. Between the first clutch C1 and the first electric motor MG1, there is disposed an oil pump 43 which is driven by the engine 14 to generate a hydraulic pressure to be applied to the first through third clutches C1-C3, the input variable-diameter pulley 30 and the output variable-diameter pulley 32.

The drive system 10 constructed as described above is operated to run the vehicle 12, with the various devices placed in different combinations of their operating states as indicated in FIG. 2. In the table of FIG. 2, "ON" and "OFF" in the column of the engine 14 respectively represent its operated state and its rest state, and "ELECTRICITY GENERATION" and "VEHICLE DRIVING" in the columns of the first and second electric motors MG1 and MG2 respectively represent their operations as the electric generator and their operations as the electric motor, while "OFF" represents their rest state. "ON" and "OFF" in the column of the first clutch C1 respectively represent its engaged state and its released state. Similarly, "ON" and "OFF" in the columns of the second and third clutches C2 and C3 respectively represent their engaged and released states.

As indicated in FIG. 2, the drive system 10 is placed in an EV drive mode by placing the first clutch C1 and the second clutch C2 in the released state, placing the third clutch C3 in the engaged state, placing the engine 14 in the rest state, placing the first electric motor MG1 in the rest state, and placing the second electric motor MG2 in the vehicle driving state. In the EV drive mode, the vehicle 12 is run with the rear wheels driven by the second electric motor MG2.

The drive system 10 is placed in a series HV drive mode 1 by placing the first clutch C1 and the second clutch C2 in the released state, placing the third clutch C3 in the engaged state, placing the engine 14 in the operated state, placing the first electric motor MG1 in the electricity generating state (regenerative state), and placing the second electric motor MG2 in the vehicle driving state. In the series HV drive mode 1, the first electric motor MG1 is driven by the engine 14, to perform the regenerative operation for generating an electric energy to be supplied to the second electric motor MG2 or the electric-energy storage device 28, and the vehicle 12 is run with the rear wheels driven by the second electric motor MG2.

The drive system 10 is placed in a series HV drive mode 2 by placing the first clutch C1 in the engaged state, placing the second clutch C2 in the released state, placing the third clutch C3 in the engaged state, placing the engine 14 in the operated state, placing the first electric motor MG1 in the electricity generating state (regenerative state), and placing the second electric motor MG2 in the vehicle driving state. In the series HV drive mode 2, the first electric motor MG1 is driven by the engine 14, to perform the regenerative operation for generating an electric energy to be supplied to the second electric motor MG2 or the electric-energy storage device 28, and the vehicle 12 is run with the rear wheels driven by the second electric motor MG2.

The drive system 10 is placed in a series HV drive mode 3 by placing the first clutch C1 in the released state, placing the second clutch C2 and the third clutch C3 in the engaged state, placing the engine 14 in the operated state, placing the first electric motor MG1 in the electricity generating state (regenerative state), and placing the second electric motor MG2 in the vehicle driving state. In the series HV drive mode 3, the first electric motor MG1 is driven by the engine 14, to perform the regenerative operation for generating an electric energy to be supplied to the second electric motor MG2 or the electric-energy storage device 28, and the vehicle 12 is run with the rear wheels driven by the second electric motor MG2.

The drive system 10 is placed in a 4-wheel drive mode (parallel) by placing the first-through third clutches C1-C3 in the engaged state, placing the engine in the operated state, placing the first electric motor MG1 in the rest state or the vehicle driving state, and placing the second electric motor MG2 in the vehicle driving state. In the 4-wheel drive mode (parallel), the front wheels are driven by at least one of the engine 14 and the first electric motor MG1, while the rear wheels are driven by the second electric motor MG2 placed in the vehicle driving state, so that the vehicle is run with the four wheels.

The drive system 10 is placed in a 4-wheel drive mode (series.parallel) by placing the first through third clutches C1-C3 in the engaged state, placing the engine 14 in the operated state, placing the first electric motor MG1 in the electricity generating state (regenerative state), and placing the second electric motor MG2 in the vehicle driving state. In the 4-wheel drive mode (series.parallel), a portion of the output of the engine 14 is used to drive the front wheels, while the remaining portion of the output is used for the regenerative operation of the electric motor MG1. An electric energy generated by the electric motor MG1 is supplied to the second electric motor MG2 or the electric-energy storage device 28, and the rear wheels are driven by the second electric motor MG2 placed in the vehicle driving state, so that the vehicle is run with the four wheels.

The drive system 10 is placed in a 4-wheel drive mode (e-4WD) by placing the first through third clutches C1-C3 in the engaged state, placing the engine 14 in the rest state, and placing the first electric motor MG1 and the second electric motor MG2 in the vehicle driving state. In the 4-wheel drive mode (e-4WD), the front wheels are driven by the first electric motor MG1, without an operation of the engine 14, while the rear wheels are driven by the second electric motor MG2, so that the vehicle is run with the four wheels.

FIG. 3 is the functional block diagram showing major functions of the control system provided for the vehicle 12. An electronic control device 44 shown in FIG. 3 functions as a control device for the drive system 10, and corresponds to a control apparatus according to the present invention. This electronic control device 44 includes a microcomputer provided with a CPU, a RAM, a ROM, an input-output interface, etc. The CPU is configured to perform signal processing operations according to programs stored in advance in the ROM while utilizing a temporary data storage function of the RAM, for implementing an output control of the engine 14, output controls of the first electric motor MG1 and second electric motor MG2, a speed ratio control of the transmission 20, and engaging and releasing controls of the first clutch C1, second clutch C2 and third clutch C3.

The electronic control device 44 receives various input signals from various sensors provided on the vehicle. For instance, the above-indicated input signals include: output signals of a battery monitoring unit 46 indicative of a temperature, a voltage, a current, etc. of the electric-energy storage device 28; an output signal of a vehicle speed sensor 48 indicative of a running speed V of the vehicle; an output signal of an engine speed sensor 50 indicative of an operating speed Ne of the engine; an output signal of a front wheel speed sensor 52 indicative of a rotating speed Nf of the front wheels 16; an output signal of a rear wheel speed sensor 54 indicative of a rotating speed Nr of the rear wheels 18; an output signal of an ambient temperature sensor 56 indicative of an ambient temperature Tair; an output signal of a snow mode switch 57 provided adjacent to a vehicle operator's seat, which output signal indicates a change of a vehicle running mode from a normal running mode to a snow running mode; an output signal of an accelerator pedal operation amount sensor 58 indicative of an operation amount Acc of an accelerator pedal; an output signal of a road surface gradient sensor 60 indicative of a gradient θ of a roadway surface; and an output signal of a road surface state detecting camera 61 indicative of a surface state of the roadway.

The above-described electronic control device 44 generates various output signals to be applied to the various devices provided on the vehicle. For example, the above-indicated output signals include: output signals to be applied to the engine 14 for controlling the output of the engine 14; output signals to be applied to the inverter 26 for controlling the outputs of the first electric motor MG1 and second electric motor MG2; and output signals to be applied to the hydraulic control circuit 36 for implementing the speed ratio control of the transmission 20 and the engaging and releasing controls of the first through third clutches C1-C3.

Figure 4:
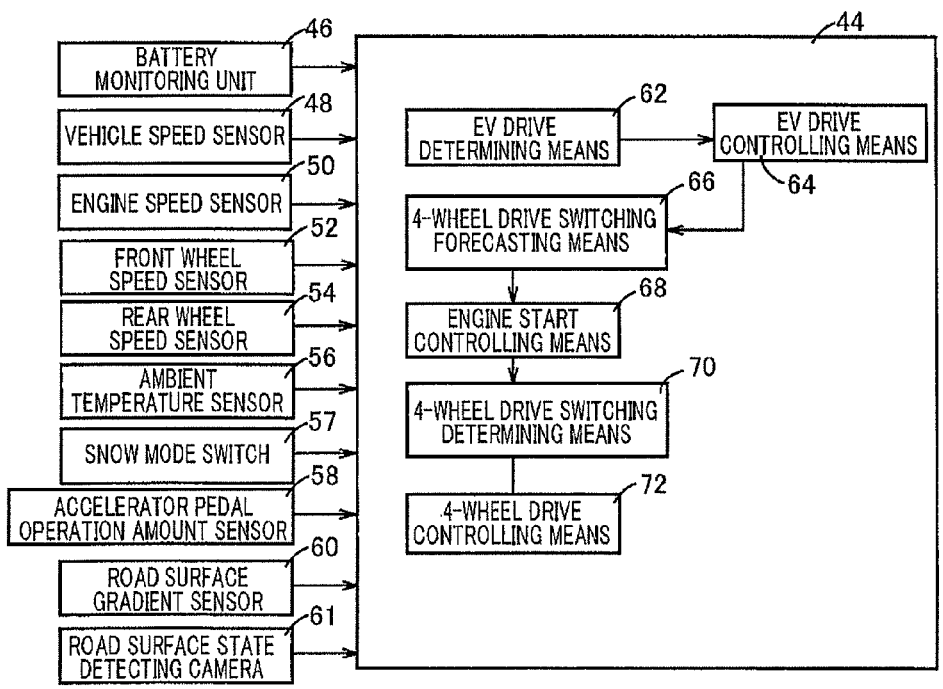
FIG. 4 is a functional block diagram for explaining major control functions of an electronic control device shown in FIG. 3, more specifically, control functions which permit rapid switching from an EV drive mode to a 4-wheel drive mode.

The electronic control device 44 is configured to implement various controls such as a drive mode switching control for switching the vehicle drive mode between the above-described series HV drive modes and the above-described engine drive mode, while controlling the speed ratio γ of the transmission 20 or the engine operating speed Ne. FIG. 4 is the functional block diagram for explaining major control functions of the above-described electronic control device 44 of the invention, more specifically, control functions which permit rapid switching from the EV drive mode to an appropriate one of the 4-wheel drive modes.

Figure 5:
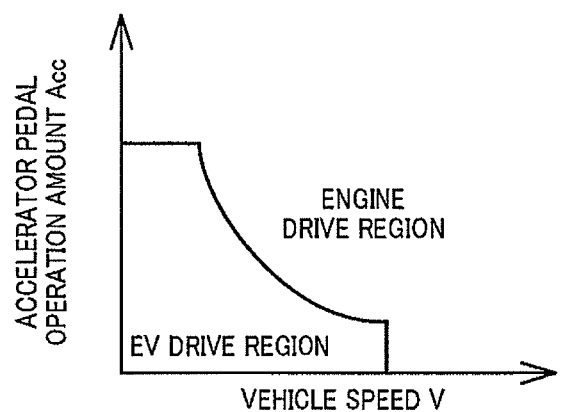
FIG. 5 is a view indicating a two-dimensional map defining regions for selecting respective drive modes of the vehicle on the basis of a vehicle running speed and an accelerator pedal operation amount.

EV drive determining means 62 is configured to determine whether a point indicative of the running condition of the vehicle 12 lies in an EV drive region, or not. For instance, the EV drive determining means 62 makes a determination as to whether the point represented by actual values of the vehicle running speed V and the accelerator pedal operation amount Acc lies in the EV drive region, according to a two-dimensional map in which the vehicle running speed V and accelerator pedal operation amount Ace are taken along respective axes, as indicated in FIG. 5. In this respect, it is noted that the EV drive region changes depending upon an electric energy amount SOC stored in the electric-energy storage device 28 and the ambient temperature Tair.

EV drive controlling means 64 is configured to implement an EV drive control of placing the engine 14 and the first electric motor MG1 in the rest state, placing the first clutch C1 and the second clutch C2 in the released state, and placing the third clutch C3 in the engaged state to run the vehicle 12 with the second electric motor MG2, as indicated in FIG. 2 when the EV drive determining means 62 determines that the point indicative of the running condition lies in the EV drive region. It is noted that the EV drive mode is switched to one of the series HV drive modes (1-3) by placing the first electric motor MG1 in the electricity generating state (regenerative state), as indicated in FIG. 2, even while the point of the vehicle running condition lies in the EV drive region shown in FIG. 5, if the temperature of the electric-energy storage device 28 detected by the battery monitoring unit 46 is higher than a predetermined upper limit T1 or lower than a predetermined lower limit T2, or if the stored electric energy amount SOC of the electric-energy storage device 28 detected by the battery monitoring unit 46 is smaller than a predetermined lower limit SOC1.

4-wheel drive switching forecasting means 66 is configured to forecast a need for switching the drive mode of the vehicle 12 from the EV drive mode in the rest state of the engine 14, to the appropriate 4-wheel drive mode, namely, to forecast a possibility of switching of the vehicle drive mode to the 4-wheel drive modes. Described more specifically, the 4-wheel drive switching forecasting means 66 calculates a slipping speed Nslip (=Nr−Nf) between the front wheels 16 and the rear wheels 18, on the basis of the rotating speed Nf of the front wheels 16 detected by the front wheel speed sensor 52, and the rotating speed Nr of the rear wheels 18 detected by the rear wheel speed sensor 54, for example. The 4-wheel drive switching forecasting means 66 forecasts the need for switching the vehicle drive mode to the appropriate 4-wheel drive mode if the calculated slipping speed Nslip is higher than zero and lower than a predetermined upper limit Nslip1. This upper limit Nslip1, which is obtained by experimentation or calculation, is set to be low enough to prevent the vehicle operator from perceiving a slipping between the wheels.

The 4-wheel drive switching forecasting means 66 is also configured to forecast the need for switching the vehicle drive mode to the appropriate 4-wheel drive mode, if the ambient temperature Tair detected by the ambient temperature sensor 56 is equal to or lower than a predetermined lower limit Tair1. The lower limit Tair1, which is obtained by experimentation, for instance, is set to be a value below which the roadway surface is expected to be frozen. The 4-wheel drive switching forecasting means 66 is further configured to forecast the need for switching the vehicle drive mode to the appropriate 4-wheel drive mode, if the gradient θ of the roadway surface detected by the road surface gradient sensor 60 is equal to or larger than a predetermined upper limit θ1. The upper limit θ1, which is obtained by experimentation, for instance, is set to be a value above which the front and rear wheels 16, 18 are expected to slip of the roadway surface. The 4-wheel drive switching forecasting means 66 is also configured to forecast a need for switching the vehicle drive mode to the 4-wheel drive mode, if the snow mode switch 57 provided adjacent to the vehicle operator's seat has been turned on, or if an analysis of an image of the surface state of the roadway obtained by the road surface state detecting camera 62-61 reveals that the road surface is frozen.

Thus, the 4-wheel drive switching forecasting means 66 employs various methods to forecast the need for switching the vehicle drive mode to one of the 4-wheel drive modes. If the need for switching the vehicle drive mode to the appropriate 4-wheel drive mode has been forecasted by the 4-wheel drive switching forecasting means 66, engine start controlling means 68 is operated to operate the first electric motor MG1 for raising the operating speed Ne of the engine 14 to a value at which the engine 14 can be kept operated by itself, so that the engine 14 is started. The engine start controlling means 68 controls the engine 14 so as to maintain its operating speed Ne and its output at predetermined values (holds the engine 14 in the operated state). After starting of the engine 14, its output is kept at a value lower than that predetermined in a normal state of running of the vehicle with the engine 14, so that the vehicle operator is less likely to feel uneasy about vibrations of the engine 14 even if the vehicle drive mode is switched to the appropriate series HV drive mode in which the engine 14 is placed in the operated state when the point of the vehicle condition lies in a region where EV drive mode, in which engine 14 is not operated, can be selected. Since the point of the vehicle running condition presently lies in the original EV drive mode region, the vehicle can be run with a sufficient amount of electric energy supplied from the electric-energy storage device 28 after switching of the vehicle drive mode to the appropriate series HV drive mode, even if the output of the engine 14 is set to be lower than the value predetermined for the normal series HV drive modes. By thus setting the output of the engine 14 to be lower than the value predetermined, for the normal series HV drive modes, deterioration of the fuel economy of the vehicle can be reduced, while at the same time the drivability of the vehicle can be kept as usual.

By keeping the started engine 14 in the operated state, the oil pump 43 is operated by the engine 14. The hydraulic pressure generated by this oil pump 43 may be applied to the first clutch C1 and the second clutch C2 which are brought into their engaged state upon switching of the vehicle drive mode to the appropriate 4-wheel drive mode, so that the first and second clutches C1, C2 are kept ready for initiating their slipping engagement (kept in a quick-fill state) by the applied hydraulic pressure. In this case, the first and second clutches C1, C2 can be rapidly brought into their engaged state when the vehicle drive mode is actually required to be switched to the 4-wheel drive mode, so that the vehicle drive mode can be rapidly switched to the desired 4-wheel drive modes.

Figure 6:
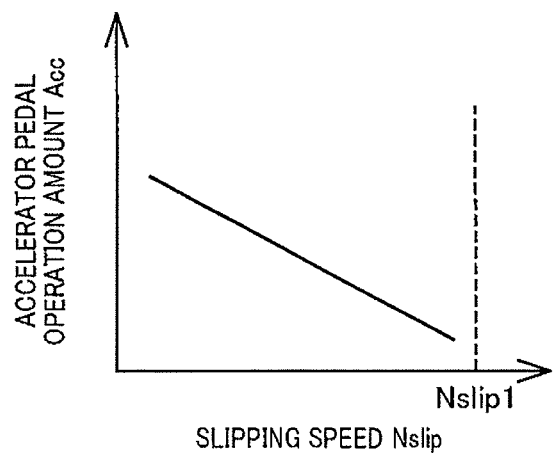
FIG. 6 is a view indicating a two-dimensional map for setting a threshold value of the accelerator pedal operation amount corresponding to a slipping speed, which is used for switching to the 4-wheel drive mode.

4-wheel drive switching determining means 70 is operated if the engine has been started by the engine start controlling means 68 after the 4-wheel drive switching forecasting means 66 had determined a possibility of switching of the vehicle drive mode to the appropriate 4-wheel drive mode. The 4-wheel drive switching determining means 70 makes a determination as to whether it is necessary to switch the vehicle drive mode to the appropriate 4-wheel drive mode. For example, this determination is made depending upon whether the slipping speed Nslip between the front and rear wheels 16 and 18 is higher than the above-indicated upper limit Nslip1. Namely, the 4-wheel drive switching determining means 70 determines that the vehicle 12 is slipping, and determines a need for switching the vehicle drive mode to the 4-wheel drive mode, if the slipping speed Nslip becomes higher than the upper limit Nslip1. Even while the slipping speed Nslip is equal to or lower than the upper limit Nslip1, the 4-wheel drive switching determines means 70 determines the need for switching the vehicle drive mode to the 4-wheel drive mode, if the accelerator pedal operation amount Acc detected by the accelerator pedal operation amount sensor 58 is larger than a predetermined upper limit Acc1. This upper limit Acc1, which is obtained by experimentation or calculation, is changed depending upon the slipping speed Nslip, as indicated in FIG. 6 by way of example. Described more specifically, the upper limit Acc1 decreases with an increase of the slipping speed Nslip. When the slipping speed Nslip is higher than the above-indicated upper limit Nslip1, the 4-wheel drive switching determining means 70 determines the need for switching of the vehicle drive mode to the 4-wheel drive mode, irrespective of the accelerator pedal operation amount Acc.

When the 4-wheel drive switching determining means 70 has determined the need for switching the vehicle drive mode to the appropriate 4-wheel drive mode, 4-wheel drive controlling means 72 places the first clutch C1 and the second clutch C2 in the engaged state, to switch the vehicle drive mode to one of the 4-wheel drive mode indicated in FIG. 2. At this time, the engine 14 has been started by the engine start controlling means 68, that is, it is not necessary to start the engine 14, so that the vehicle drive mode can be switched to the desired 4-wheel drive mode rapidly to obtain a required traction (e.g. vehicle drive force).

Figure 7:
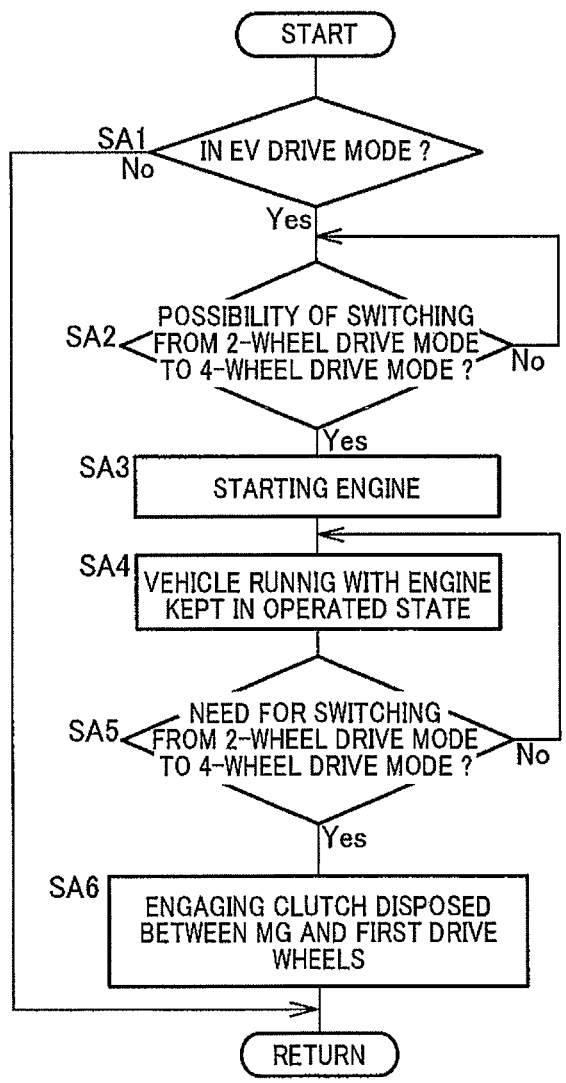
FIG. 7 is a flow chart for explaining major portions of a control operation of the electronic control device of FIG. 3, namely, a control operation which permits the rapid switching to the 4-wheel drive mode.

FIG. 7 is the flow chart for explaining major portions of the control operation of the electronic control device 44, namely, the control operation which permits the rapid switching to the 4-wheel drive mode to obtain a required traction. The control operation is repeatedly performed with an extremely short cycle time of about several milliseconds to several tens of milliseconds.

Initially, step SA1 ("step" being hereinafter omitted) corresponding to the EV drive determining means 62 is implemented to determine whether the point indicative of the present running condition of the vehicle 12 lies in the EV drive region. If a negative determination is obtained in SA1, the present control routine is terminated. If an affirmative determination is obtained in SA1, that is, if it is determined that the point of the present running condition lies in the EV drive region, the control flow goes to SA2 corresponding to the 4-wheel drive switching forecasting means 66, to forecast the need for switching the vehicle drive mode from the EV drive mode for running the vehicle with the two wheels, to the appropriate 4-wheel drive modes. This forecasting is made by a determination on the basis of the above-indicated slipping speed Nslip, ambient temperature Tair, roadway surface gradient θ and operating state of the snow mode switch 57. If a negative determination is obtained in SA2, this step is repeatedly implemented until an affirmative determination is obtained, so that the vehicle is run in the EV drive mode until the affirmative determination is obtained in SA2. If the affirmative determination is obtained in SA2, that is, if the need for switching the vehicle drive mode to the 4-wheel drive mode has been forecasted, the control flow goes to SA3 corresponding to the engine start controlling means 68, to start the engine 14. Described more specifically, the first electric motor MG1 is operated for raising the operating speed Ne of the engine 14 to a value at which the engine 14 can be kept operated by itself, so that combustion in the engine 14 is started. Then, the control flow goes to SA4 corresponding to the engine start controlling means 68, to run the vehicle with the engine 14 kept operated by itself (kept in the operated state).

Then, SA5 corresponding to the 4-wheel drive switching determining means 70 is implemented to determine whether it is actually necessary, to switch the vehicle drive mode to the appropriate 4-wheel drive mode. Described more specifically, this determination is made depending upon whether the above-indicated slipping speed Nslip is higher than the above-indicated upper limit Nslip1, or whether the accelerator pedal operation amount Acc is larger than the predetermined upper limit Acc1. If a negative determination is obtained in SA5, the control flow goes back to SA4, and the engine 14 is kept operated by itself until an affirmative determination is obtained in SA5. When the affirmative determination is obtained in SA5, the control flow goes to SA6 corresponding to the 4-wheel drive controlling means 72, to place the first clutch C1 and the second clutch C2 in the engaged state, for rapidly switching the vehicle drive mode to the appropriate 4-wheel drive mode.

The present embodiment described above is configured to start the engine 14 when the need for switching to one of the 4-wheel drive modes has been forecasted, so that the vehicle drive mode can be rapidly switched to the appropriate 4-wheel drive mode, by placing the first and second clutches C1, C2 in the engaged state when the need for actual switching to the 4-wheel drive mode is determined. Namely, since the engine 14 has already been started, the time required for switching the vehicle drive mode to the appropriate 4-wheel drive mode can be shortened by a length of time required for starting the engine 14, so that the desired vehicle drive force can be obtained in a short time.

The hybrid vehicle according to the present embodiment is provided with the oil pump 43 which is operated by the engine 14 to apply the hydraulic pressure to the first clutch C1 and the second clutch C2, for placing the first and second clutches C1, C2 selectively in a power transmitting state or a power cut-off state, and the control apparatus is configured to apply the hydraulic pressure to the first and second clutches C1, C2, for keeping the first and second clutches C1, C2 ready to be placed in the power transmitting state with the predetermined hydraulic pressure, when the need for switching to the appropriate 4-wheel drive mode has been forecasted. Accordingly, the vehicle drive mode can be rapidly switched to the 4-wheel drive mode when the need for actual switching to the 4-wheel drive mode is determined.

Another embodiment of this invention will be described. In the following description, the same reference signs as used in the preceding embodiment will be used to identify the corresponding elements, which will not be redundantly described.

Second Embodiment

Figure 8:
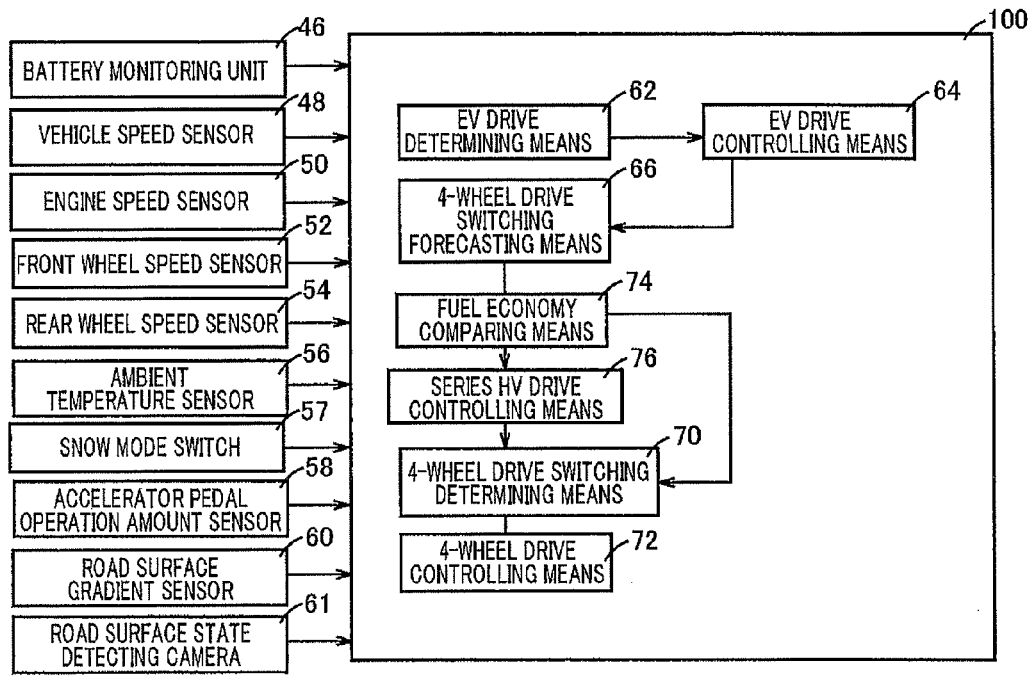
FIG. 8 is a functional block diagram corresponding to that of FIG. 4, for explaining major control functions of an electronic control device according to another embodiment of this invention.

FIG. 8 is the functional block diagram corresponding to that of FIG. 4 according to the preceding embodiment, for explaining major control functions of an electronic control device 100 according to another embodiment of this invention. The EV drive determining means 62, EV drive controlling means 64, 4-wheel drive switching forecasting means 66, 4-wheel drive switching determining means 70 and 4-wheel drive controlling means 72, which are shown in FIG. 8, have the same functions as described above with respect to the preceding embodiment, and will not be redundantly described.

Fuel economy comparing means 74 shown in FIG. 8 is operated upon determination by the 4-wheel drive switching forecasting means 66 that there is a possibility of switching the vehicle drive mode to one of the 4-wheel drive modes. The fuel economy comparing means 74 is configured to compare with each other a degree of fuel economy of the vehicle running in the series HV drive modes 1-3 with the engine 14 held in the operated state, and a degree of fuel economy of the vehicle running in the 4-wheel drive mode with the first and second electric motors MG1 and MG2 held in the operated state and with the engine 14 held in the rest state to determine which mode has the highest degree of fuel economy. The fuel economy comparing means 74 calculates an amount of consumption of the fuel in the series HV drive modes, on the basis of a predetermined amount of fuel supply to the engine 14 in the series HV modes, and an amount of fuel corresponding to an amount of generation of an electric energy by the first electric motor MG1 and an amount of consumption of an electric energy by the second electric motor MG2, which amount of fuel is calculated by conversion according to a predetermined map or calculation formula. Further, the fuel economy comparing means 74 calculates an amount of consumption of the fuel in the 4-wheel drive mode for running of the vehicle with the first and second electric motors MG1, MG2, which amount of consumption of the fuel is calculated by conversion on the basis of the amount of consumption of an electric energy by the first and second electric motors MG1, MG2 and according to a stored map or calculation formula for converting the amount of consumption of the electric energy into the amount of consumption of the fuel. The fuel economy comparing means 74 determines a smaller one of the calculated two amount of consumption of the fuel, as a higher one of the two degrees of fuel economy.

If the fuel economy comparing means 74 determines that the 4-wheel drive mode for running with the first and second electric motors MG1, MG2 has the higher degree of fuel economy, the EV drive mode is maintained without starting the engine 14. When the 4-wheel drive switching determining means 70 determines the need for switching the vehicle drive mode to the appropriate 4-wheel drive mode, the 4-wheel drive controlling means 72 places the first and second clutches C1, C2 in the engaged state, to initiate the vehicle running in the 4-wheel drive mode with the first and second electric motors MG1, MG2 placed in the vehicle driving state. In this respect, it is noted that the vehicle driving operations of the first and second electric motors MG1, MG2 can be initiated in a shorter time than the starting operation of the engine 14, there arises substantially no delay in the switching of the vehicle drive mode to the 4-wheel drive mode, so that the desired vehicle drive force can be obtained in a short time.

Figure 9:
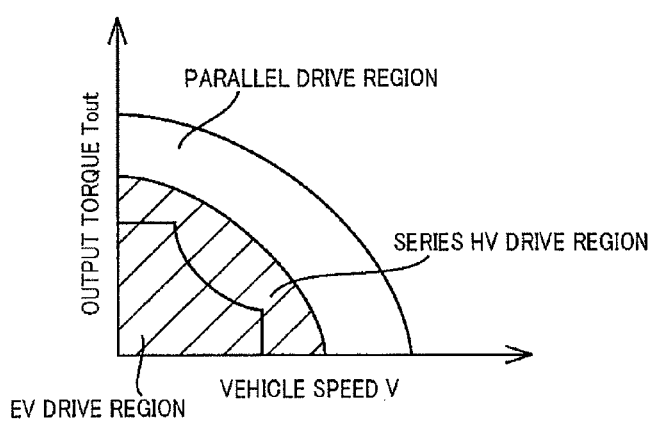
FIG. 9 is a view indicating a two-dimensional map defining regions for selecting respective drive modes of the vehicle on the basis of the vehicle running speed and an output torque of an output shaft of a transmission.

If the fuel economy comparing means 74 determines that the series HV drive modes have the higher degree of fuel economy, series HV drive controlling means 76 places the second clutch C2 in the engaged state, and places the second electric motor MG2 in the vehicle driving state, while holding the engine 14 in the operated state to operate the first electric motor MG1 for generating an electric energy, so that the vehicle is run in the series HV drive modes (series HV modes 1-3). FIG. 9 is the view indicating a two-dimensional map defining regions for selecting respective drive modes of the vehicle 12 on the basis of the vehicle running speed V and the output torque Tout of the output shaft of the transmission 20. Usually, the EV drive mode is selected in a region in which the vehicle running speed and the output torque are comparatively low, and the series HV drive modes are selected in a region in which the vehicle running speed and the output torque are intermediate, while the parallel drive mode is selected in a region in which the vehicle running speed and the output torque are comparatively high. When the fuel economy comparing means 74 determines that the series HV drive modes have the higher degree of fuel economy, and the series HV drive controlling means 76 is operated, however, the EV drive mode region is changed into the series HV drive mode region, as indicated by oblique lines in FIG. 9 even in the EV drive mode region. Namely, the series HV drive mode region is enlarged to cover the EV drive mode region, so that the vehicle is run in the appropriate series HV drive mode even in the EV drive mode region. Although the series HV drive mode region is enlarged to cover the entirety of the EV drive mode region in the present embodiment, the series HV drive mode region need not be enlarged to cover the entirety of the EV drive mode region, but may be enlarged to cover only a portion of the EV drive mode region.

Where the series HV drive controlling means 76 is operated in the conditions described above, the engine output in the series HV drive mode is set to be lower than that before the series HV drive mode region is enlarged (than that in the series HV drive mode selected in the original HV drive mode region). In this respect, it is noted that when the series HV chive controlling means 76 is operated, the series HV drive mode is selected even in the original EV drive mode region in which the vehicle running speed and the output torque are comparatively low so that the required amount of consumption of the electric energy is comparatively small, and the vehicle can be run with the electric energy stored in the electric-energy storage device 28. Accordingly, the required output of the engine 14 can be reduced, and the deterioration of the fuel economy clue to operation of the engine 14 can be minimized. The reduction of the output of the engine 14 also makes it possible to reduce a possibility of the vehicle operator feeling uneasy about vibrations of the engine 14.

When the 4-wheel drive switching determining means 70 determines the need for switching the vehicle drive mode to the appropriate 4-wheel drive mode, the 4-wheel drive controlling means 72 places the first clutch C1 in the engaged state, for rapidly switching the vehicle drive mode from the presently selected series HV drive mode to the appropriate 4-wheel drive mode.

FIG. 10 is the flow chart corresponding to that of FIG. 7, for explaining major portions of a control operation of the electronic control device 100 in the present embodiment. Initially, step SA1 in FIG. 10 corresponding to the EV drive determining means 62 is implemented to determine whether the presently selected vehicle drive mode is the EV drive mode. If the negative determination is obtained in SA1, the present control routine is terminated. If the affirmative determination is obtained in SA1, on the other hand, the control flow goes to SA2 corresponding to the 4-wheel drive switching forecasting means 66, to forecast the need for switching the vehicle drive mode from the EV drive mode for running the vehicle with the two wheels, to the appropriate 4-wheel drive modes. If the negative determination is obtained in SA2, this step is repeatedly implemented until the affirmative determination is obtained, so that the vehicle is run in the EV drive mode until the affirmative determination is obtained in SA2. If the affirmative determination is obtained in SA2, that is, if the need for switching the vehicle drive mode to the 4-wheel drive mode has been forecasted, the control flow goes to SA7 corresponding to the fuel economy comparing means 74, to compare with each other the degree of fuel economy of the vehicle running in the series HV drive modes with the engine 14 held in the operated state, and the degree of fuel economy of the vehicle running in the 4-wheel drive mode (e-4WD) with the first and second electric motors MG1 and MG2 held in the operated state and with the engine 14 held in the rest state, and to determine a higher one of the calculated two degrees of fuel economy. If the fuel economy comparing means 74 determines that the series HV drive modes have the higher degree of fuel economy, an affirmative determination is obtained in SA7, and the control flow goes to SA3' and the following steps. If it is determined that the 4-wheel drive mode (e-4WD) for running the vehicle with the first and second electric motors MG1, MG2 held in the operated state and with the engine 14 held in the rest state has the higher degree of fuel economy, on the other hand, the control flow goes to SA8 and the following steps.

To begin with, SA3' implemented when the affirmative determination is obtained in SA7 will be described. In SA3' corresponding to the series HV drive controlling means 76, the vehicle drive mode is switched to an appropriate one of the series HV drive modes 1-3 in which the engine 14 is started. Described more specifically, in accordance with the table of FIG. 2 the engine 14 is started, and the second clutch C2 is placed in the engaged state. It will be understood that like the engine start controlling means 68, the series HV drive controlling means 76 functions as engine starting means for starting the engine 14. Then, the control flow goes to SA4' corresponding to the series HV drive controlling means 76, to maintain the appropriate series HV drive mode. In this series HV drive mode, the engine 14 has a higher degree of freedom in its operating point than in the 4-wheel drive mode for running the vehicle with the engine 14 connected to the front wheels 16 (drive wheels), for example, so that the deterioration of the fuel economy is reduced and it is possible to rapidly switch the vehicle drive mode from the series HV drive mode to the 4-wheel drive mode when the 4-wheel drive mode is needed.

Then, the control flow goes to SA5 corresponding to the 4-wheel drive switching determining means 70, to determine whether it is actually necessary to switch the vehicle drive mode to the appropriate 4-wheel drive mode. If the negative determination is obtained in SA5, the control flow goes back to SA4', which is repeatedly implemented until the affirmative determination is obtained in SA5. If the affirmative determination is obtained in SA5, the control flow goes to SAG corresponding to the 4-wheel drive controlling means 72, to place the first clutch C1 in the engaged state, for rapidly switching the vehicle drive mode to the appropriate 4-wheel drive mode.

If a negative determination is obtained in SA7, the control flow goes to SA8 corresponding to the 4-wheel drive switching determining means 70, to determine whether it is actually necessary to switch the vehicle drive mode from the EV drive mode to the appropriate 4-wheel drive mode while in the EV drive mode. If a negative determination is obtained in SA8, the EV drive mode is maintained, and SA8 is repeatedly implemented until an affirmative determination is obtained in SA7. When the affirmative determination is obtained in SA8, the control flow goes to SA9 in which the first and second clutches C1, C2 are placed in the engaged state, and the vehicle is run in the 4-wheel drive mode with the first and second electric motors MG1, MG2 placed in the vehicle driving state.

Like the preceding embodiment, the present embodiment described above is configured to make it possible to rapidly switch the vehicle drive mode to the appropriate 4-wheel drive mode. Further, the hybrid vehicle further has the series HV drive mode in which the hybrid vehicle is run with the second electric motor MG2, in the released state of the first clutch C1, while the first electric motor MG1 is operated with the drive force of the engine 14 to generate an electric energy. When the need for switching to the 4-wheel drive mode has been forecasted, the engine 14 is started, and the region for running the hybrid vehicle in the series HV drive modes is enlarged, so as to cover the original region for running the hybrid vehicle in the EV drive mode. Accordingly, the series HV drive modes are selected when the need for switching to the appropriate 4-wheel drive mode has been forecasted, so that upon determination that it is actually necessary to switch the vehicle drive mode to the appropriate 4-wheel drive mode, the first clutch C1 is engaged to rapidly switch the vehicle drive mode to the 4-wheel drive mode, whereby the desired vehicle drive force can be obtained in a short time. In addition, the appropriate series HV drive mode is maintained until the moment of the determination of the need for switching to the 4-wheel drive mode, so that the engine 14 has a higher degree of freedom in its operating point than in the 4-wheel drive mode for running the vehicle with the engine 14 connected to the front wheels 16 (drive wheels), for example, whereby the deterioration of the fuel economy is reduced and it is possible to rapidly switch the vehicle drive mode from the series HV drive mode to the desired 4-wheel drive mode if the 4-wheel drive mode is needed.

The present embodiment is further configured such that the output of the engine 14 in the series HV drive mode selected after the need for switching to the appropriate 4-wheel drive mode has been forecasted is set to be lower than that in the series HV drive mode before the series HV drive mode region is enlarged. Accordingly, the vehicle operator is less likely to feel uneasy about vibrations of the engine 14 even if the vehicle drive mode is switched to the appropriate series HV drive mode in which the engine 14 is placed in the operated state when the EV drive mode can be selected in which the engine 14 is not operated. Since the point of the vehicle running condition presently lies in the original EV drive mode region, the vehicle can be run with a sufficient amount of electric energy supplied from the electric-energy storage device 28 after switching of the vehicle drive mode to the appropriate series HV drive mode, even if the output of the engine 14 is set to be lower than that before the series HV drive mode region is enlarged. By thus setting the output of the engine 14 to be lower than that before the series HV drive mode region is enlarged, deterioration of the fuel economy of the vehicle can be reduced, while at the same time the drivability of the vehicle can be kept as usual.

The present embodiment is also configured to inhibit the switching to the series HV drive mode, and to place the hybrid vehicle in a 4-wheel drive run in which the hybrid vehicle is run with the first electric motor MG1 and the second electric motor MG2, upon determination of switching to the 4-wheel drive mode, if it has been determined that the 4-wheel drive run in which the hybrid vehicle is run with the first electric motor MG1 and the second electric motor MG2 while the engine 14 is placed in the rest state has a higher degree of fuel economy than the series HV drive mode, after the need for switching to the 4-wheel drive mode has been forecasted. Accordingly, the hybrid vehicle is run with the four drive wheels in one of the 4-wheel drive mode and the series HV drive mode which has the higher degree of fuel economy, so that the fuel economy is improved.

While the embodiments of this invention have been described in detail by reference to the drawings, it is to be understood that the invention may be otherwise embodied.

For example, the transmission 20 provided in the illustrated embodiments is not essential according to the present invention. Further, the transmission 20 is not limited to the belt-type continuously-variable transmission, but may be of any other type such as a step-variable automatic transmission.

While the engine 14 and the first electric motor MG1 are connected in series to each other in the illustrated embodiments, the series connection is not essential, and the engine 14 and the first electric motor MG1 may be connected in parallel to each other, through gears, for instance.

Although the first clutch C1 and the second clutch C2 are provided as the connecting/disconnecting device in the illustrated embodiments, only one of them may be provided.

In the illustrated embodiments, the oil pump 43 is disposed between the first clutch C1 and the first electric motor MG1. However, the position of the oil pump 43 is not limited to that in the illustrated embodiments. For instance, the oil pump 43 may be disposed between the first electric motor MG1 and the engine 14, or at any other position, provided the oil pump 43 is operated by the engine 14.

In the preceding embodiment, the entirety of the EV drive mode region is changed into the series HV drive mode region, as indicated by oblique lines in FIG. 9. However, the entirety of the EV drive mode region need not be changed into the series HV drive mode region, and only a portion of the EV drive mode region may be changed into the series HV drive mode region.

Further, the fuel economy comparing means 74 need not be provided in the preceding embodiment. In this case, the vehicle drive mode can be switched to the appropriate series HV drive mode if the 4-wheel drive switching forecasting means 66 has forecasted the need for switching the vehicle drive mode to the appropriate 4-wheel drive mode.

In the illustrated embodiments, the need for switching the vehicle drive mode to one of the 4-wheel drive modes is forecasted if the snow mode switch 57 is placed in the on state. However, it is possible to forecast the need for switching the vehicle drive mode to the appropriate 4-wheel drive mode, upon detection of an operation of any one of mode selecting means other than the snow mode switch 57, for selecting any one of the 4-wheel drive modes for running of the vehicle on abnormal roadways or for more increased acceleration or drivability relative to normal conditions. Such mode selecting means include a 4WD selector switch, an off-road running switch and a sporty drive mode switch.

It is to be understood that the illustrated embodiments have been described for illustrative purpose only, and that the present invention may be embodied with various changes and improvements, which may occur to those skilled in the art.

NOMENCLATURE OF REFERENCE SIGNS

14: Engine
16: Front wheels (First drive wheels)
18: Rear wheels (Second drive wheels)
43: Oil pump
44, 100: Electronic control device
C1: First clutch (Connecting/disconnecting device)
C2: Second clutch (Connecting/disconnecting device)
MG1: First electric motor
MG2: Second electric motor

The invention claimed is:

1. A control apparatus for a hybrid vehicle comprising:
a controller programmed to perform as: an engine starting device that starts an engine when a need for switching to 4-wheel drive mode has been forecasted, wherein, in the 4-wheel drive mode, first drive wheels are driven with at least one of the engine and a first electric motor connected to the engine, in an engaged state of a connecting/disconnecting device, which is disposed (i) between the engine and the first drive wheels and (ii) between the first electric motor and the first drive wheels, in accordance with a vehicle running condition, while second drive wheels are driven with a second electric motor connected to the second drive wheels; and
a series Hybrid Vehicle (HV) drive controlling device that starts the engine and increases a series HV drive mode region for running the hybrid vehicle in a series HV drive mode, in which the hybrid vehicle is run with the second electric motor, in the released state of the connecting/disconnecting device, while the first electric motor is operated with a drive force of the engine to generate an electric energy, so as to cover a portion or an entirety of an original Electric Vehicle (EV) drive mode region for running the hybrid vehicle in an EV drive mode, in which the hybrid vehicle is run with only the second electric motor.

2. The control apparatus according to claim 1, wherein an output of said engine in the series HV drive mode selected by said series HV drive controlling device after the need for switching to said 4-wheel drive mode has been forecasted is set to be lower than that in said series HV drive mode before said series HV drive mode region is increased.

3. The control apparatus according to claim 1, further comprising fuel economy comparing device that determines whether the 4-wheel drive mode in which the hybrid vehicle is run with said first electric motor and said second electric motor while said engine is placed in a rest state has a higher degree of fuel economy than said series HV drive mode, after the need for switching to said 4-wheel drive mode has been forecasted, the control apparatus inhibiting the switching to said series HV drive mode, and placing the hybrid vehicle in a 4-wheel drive run in which the hybrid vehicle is run with said first electric motor and said second electric motor, upon determination of switching to the 4-wheel drive mode, if said fuel economy comparing device has determined that the 4-wheel drive run has the higher degree of fuel economy than said series HV drive mode.

4. The control apparatus according to claim 1, wherein the hybrid vehicle is provided with an oil pump which is operated by said engine to apply a hydraulic pressure through a hydraulic control circuit to said connecting/disconnecting device, for placing the connecting/disconnecting device selectively in a power transmitting state or a power cut-off state,
and wherein the control apparatus commands said hydraulic control circuit to apply the hydraulic pressure to said connecting/disconnecting device, for keeping the connecting/disconnecting device ready to be placed in the power transmitting state with a predetermined hydraulic pressure, when the need for switching to the 4-wheel drive mode has been forecasted.

5. The control apparatus according to claim 2, further comprising fuel economy comparing device that determines whether the 4-wheel drive mode in which the hybrid vehicle is run with said first electric motor and said second electric motor while said engine is placed in a rest state has a higher degree of fuel economy than said series HV drive mode, after the need for switching to said 4-wheel drive mode has been forecasted, the control apparatus inhibiting the switching to said series HV drive mode, and placing the hybrid vehicle in a 4-wheel drive run in which the hybrid vehicle is run with said first electric motor and said second electric motor, upon determination of switching to the 4-wheel drive mode, if said fuel economy comparing device has determined that the 4-wheel drive run has the higher degree of fuel economy than said series HV drive mode.

* * * * *

UNITED STATES PATENT AND TRADEMARK OFFICE
CERTIFICATE OF CORRECTION

PATENT NO.        : 9,061,679 B2                                   Page 1 of 1
APPLICATION NO.   : 14/006470
DATED             : June 23, 2015
INVENTOR(S)       : Maruyama et al.

It is certified that error appears in the above-identified patent and that said Letters Patent is hereby corrected as shown below:

The Title Page, Item (75), delete "Ryoki I1, Toyota (JP)" and insert --Ryoki II, Toyota (JP)--.

Signed and Sealed this
Twenty-second Day of December, 2015

Michelle K. Lee
*Director of the United States Patent and Trademark Office*